(12) United States Patent
Berno

(10) Patent No.: US 9,896,010 B2
(45) Date of Patent: Feb. 20, 2018

(54) SEAT ASSEMBLY WITH A HIDEAWAY TABLE

(71) Applicant: GM GLOBAL TECHNOLOGY OPERATIONS LLC, Detroit, MI (US)

(72) Inventor: Mario A. Berno, Sao Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 14/801,915

(22) Filed: Jul. 17, 2015

(65) Prior Publication Data

US 2017/0015228 A1   Jan. 19, 2017

(51) Int. Cl.
| | | |
|---|---|---|
| *B60N 3/00* | (2006.01) | |
| *B60N 2/30* | (2006.01) | |
| *B60R 7/04* | (2006.01) | |
| *B60N 2/68* | (2006.01) | |

(52) U.S. Cl.
CPC .......... *B60N 3/002* (2013.01); *B60N 2/3043* (2013.01); *B60N 2/686* (2013.01); *B60N 3/001* (2013.01); *B60R 7/043* (2013.01)

(58) Field of Classification Search
CPC ...... B60N 3/002; B60N 3/001; B60N 2/3043; B60R 7/043
See application file for complete search history.

(56) References Cited

U.S. PATENT DOCUMENTS

| | | | |
|---|---|---|---|
| 3,488,089 A | | 1/1970 | Brennan |
| 4,643,480 A | * | 2/1987 | Morita ..................... B60N 2/70 |
| | | | 297/226 |
| 4,699,427 A | * | 10/1987 | Kobayashi ......... B29D 99/0092 |
| | | | 297/452.27 |
| 5,690,384 A | * | 11/1997 | Rossi ....................... B60N 2/58 |
| | | | 297/228.13 |
| 5,951,111 A | * | 9/1999 | Klimenko ................ A47C 4/54 |
| | | | 297/188.09 |
| 6,079,773 A | * | 6/2000 | Hassan ..................... B60N 2/44 |
| | | | 297/112 |
| 6,082,815 A | | 7/2000 | Xiromeritis et al. |
| 6,135,549 A | | 10/2000 | Demick et al. |
| 6,386,629 B1 | * | 5/2002 | Severinski ........... B60N 2/3011 |
| | | | 297/113 |

(Continued)

FOREIGN PATENT DOCUMENTS

| | | |
|---|---|---|
| DE | 20006562 U1 | 8/2001 |
| DE | 102004039935 A1 | 3/2006 |

*Primary Examiner* — Timothy J Brindley
(74) *Attorney, Agent, or Firm* — Quinn IP Law

(57) ABSTRACT

A seat assembly includes a seatback, a seat cushion. The seat assembly also includes a seat frame having a first seat frame structure configured to support the seatback and a second seat frame structure configured to support the seat cushion. A hideaway table is positioned in the seat cushion. The first seat frame structure is operatively connected to the second seat frame structure. The seat cushion defines a seat cushion support surface for an occupant of the seat assembly and includes a first cushion portion fixed to the second seat frame structure and a second cushion portion operatively connected to the first cushion portion. The second cushion portion is configured to pivot relative to the first cushion portion to selectively cover and uncover the table. A vehicle having such a seat assembly is also disclosed.

4 Claims, 3 Drawing Sheets

(56) References Cited

U.S. PATENT DOCUMENTS

| | | | | |
|---|---|---|---|---|
| 6,419,313 | B1* | 7/2002 | Newman | B60N 2/70 296/37.15 |
| 6,435,609 | B1* | 8/2002 | Gasser | B60N 2/462 297/144 |
| 6,547,323 | B1 | 4/2003 | Aitken et al. | |
| 6,869,121 | B2* | 3/2005 | Kayumi | B60N 2/01 296/37.15 |
| 6,877,807 | B2* | 4/2005 | Mizuno | B60N 2/305 297/188.08 |
| 7,600,811 | B2 | 10/2009 | Park et al. | |
| 9,545,863 | B2* | 1/2017 | Alfano | B60N 2/643 |
| 2008/0136220 | A1* | 6/2008 | Park | B60N 3/002 297/135 |
| 2008/0315637 | A1* | 12/2008 | Ghisoni | B60N 2/5825 297/216.13 |
| 2010/0194133 | A1* | 8/2010 | Nakamura | B60R 7/043 296/37.8 |
| 2014/0132040 | A1* | 5/2014 | Arakawa | B60N 2/6009 297/112 |
| 2015/0165950 | A1* | 6/2015 | Sachs | B60N 2/62 297/452.48 |
| 2017/0008438 | A1* | 1/2017 | Clark | B60N 2/64 |

* cited by examiner

SEAT ASSEMBLY WITH A HIDEAWAY TABLE

TECHNICAL FIELD

The present disclosure relates to a seat assembly having a hideaway table incorporated therein.

BACKGROUND

Vehicles are typically provided with seats designed to accommodate the operator and passenger(s) of the vehicle. Frequently, such seats are configured to shift inside the vehicle as well as recline in order to enhance passenger comfort and be moved out of the way to generate useful space for transporting cargo. Some vehicle seats employ mechanisms that permit the seats to fold and/or be removed from the subject vehicle to further improve the versatility of the subject vehicle.

SUMMARY

A seat assembly includes a seatback, a seat cushion. The seat assembly also includes a seat frame having a first seat frame structure configured to support the seatback and a second seat frame structure configured to support the seat cushion. A hideaway table is positioned in the seat cushion. The first seat frame structure is operatively connected to the second seat frame structure. The seat cushion defines a seat cushion support surface for an occupant and includes a first cushion portion fixed to the second seat frame structure and a second cushion portion operatively connected to the first cushion portion. The second cushion portion is configured to pivot relative to the first cushion portion to selectively cover and uncover the table.

The table may include a first section fixed to the first cushion portion and a second section fixed to the second cushion portion.

The seat assembly may also include a hinge directly connecting the second section of the table to the first section of the table. In such a case, the hinge may be configured to pivot the second cushion portion relative to the first cushion portion.

The second cushion portion may define the entire seat cushion support surface for an occupant of the seat assembly.

The first cushion portion and the second cushion portion may together define the seat cushion support surface for an occupant of the seat assembly. In such a construction of the seat cushion, the first cushion portion may include a pocket and the table may be positioned in the pocket. In such a case, the second cushion portion may pivot to selectively fit into and extend out of the pocket to thereby selectively cover and uncover the table.

The seat cushion may additionally include a table frame arranged between the table and the first cushion portion, and fixed to the first cushion portion.

The table may be detachably fastened to the table frame.

Each of the table frame, the first section, and the second section may be formed from plastic.

The seat cushion may be defined by a length arranged along a first axis and a width arranged along a second axis orthogonal to the first axis. The second cushion portion may be configured to pivot relative to the first cushion portion in a direction along the second axis.

A vehicle having the disclosed seat assembly is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
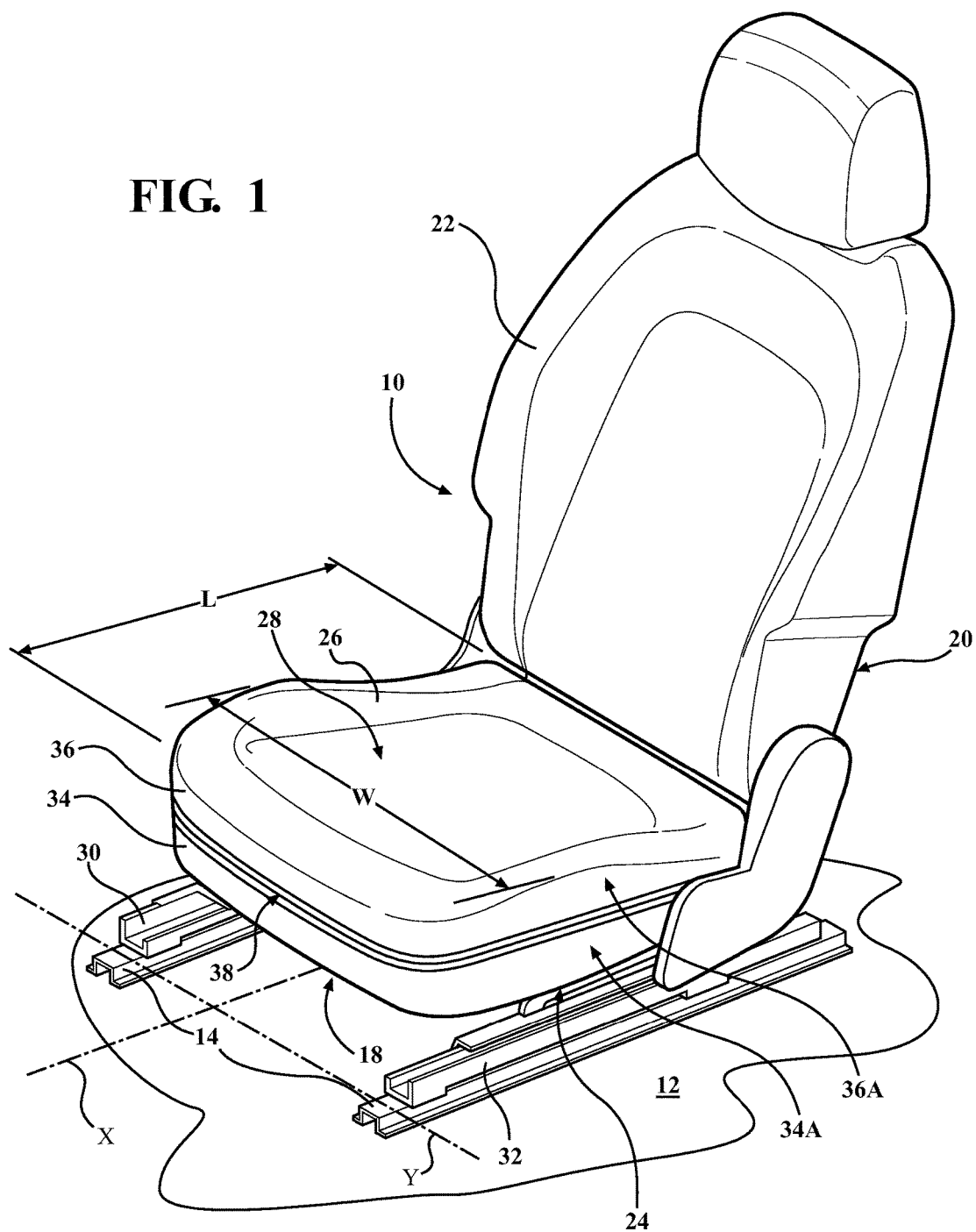
FIG. 1 is a perspective view of a seat assembly mounted in a vehicle and having a hideaway table according to one embodiment of the disclosure.

Referring to the drawings, wherein like reference numbers refer to like components, FIGS. 1-4 show a perspective view of a seat assembly 10. As shown, the seat assembly 10 is positioned in a vehicle 12, for example inside a vehicle passenger compartment, and operatively connected to a vehicle structure 14, such as inside the passenger compartment. The vehicle 12 may have any body style configuration, for example a sedan, a wagon, a van, or a pick-up truck. The seat assembly 10 as described below may be positioned anywhere in the vehicle 12, such as in the first row, adjacent to another seat assembly arranged for an operator/driver of the vehicle, or in any other row within the passenger compartment.

The seat assembly 10 includes a seat frame 18. The seat frame 18 includes a first seat frame structure 20 that is configured to support a seatback 22. The seat frame 18 also includes a second seat frame structure 24 that is configured to support a seat cushion 26 defining a seat cushion support surface 28 for an occupant of the seat assembly 10. The first seat frame structure 20 is operatively connected, for example, pivotably attached, to the second seat frame structure 24 to accommodate an occupant of the of the seat assembly 10. The seat assembly 10 may be operatively connected, such as slidably mounted to the vehicle structure 14 at the second seat frame structure 24. Such slidable mounting of the seat assembly 10 to the vehicle structure 14 may be provided via a first track 30 and a second track 32 to provide adjustment of seat the position within the vehicle 12.

The seat cushion 26 includes a first cushion portion 34 fixed to the second seat frame structure 24 and a second cushion portion 36 operatively connected to the first cushion portion. A hideaway table 38 is positioned in the seat cushion 26. The second cushion portion 36 is configured to pivot relative to the first cushion portion 34 to selectively cover and uncover the table 38. In other words, the second cushion portion 36 is constructed to fold onto the first cushion portion 34 to present the seat cushion support surface 28 to an occupant of the seat assembly 10 when such is needed, and thereby also hide the table 38. When the seat assembly 10 is not called upon to accommodate an occupant, the hideaway table 38 may be uncovered to provide a support surface for various objects, for example a laptop computer that may be used by an individual occupying an adjacent seat.

The table 38 may include a first section 38A fixed to the first cushion portion 34 and a second section 38B fixed to the second cushion portion 36. The first section 38A may additionally be pivotably attached to the second section 38B via a hinge 40. Accordingly, by directly connecting the second section 38B of the table 38 to the first section 38A of the table, the hinge 40 may facilitate pivoting of the second cushion portion 36 relative to the first cushion portion 34.

Figure 2:
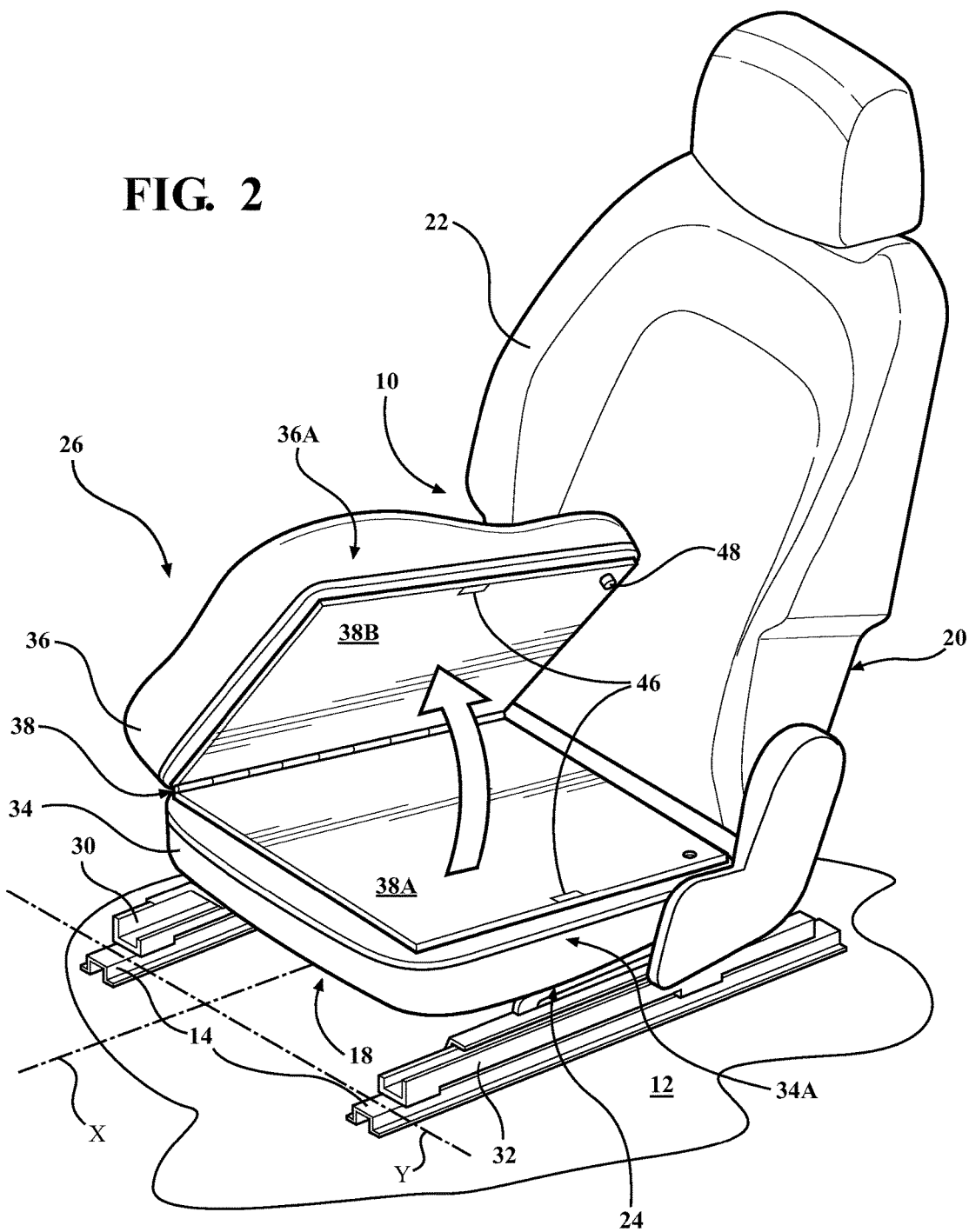
FIG. 2 is a perspective view of the seat assembly having the hideaway table shown in FIG. 1, illustrating a seat cushion being pivoted to uncover the hideaway table according to the disclosure.
Figure 3:
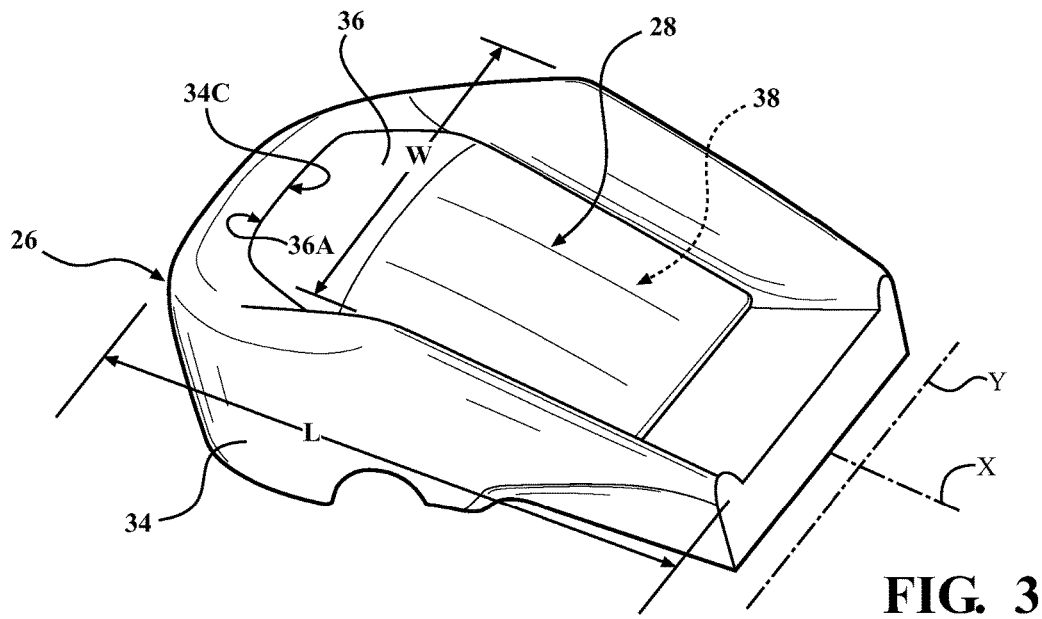
FIG. 3 is a perspective view of a seat assembly mounted in a vehicle and having a hideaway table according to another embodiment of the disclosure.

In one embodiment of the seat assembly 10, shown in FIGS. 1-2, the second cushion portion 36 may define the seat cushion support surface 28 in its entirety, i.e., the entire seat cushion support surface for an occupant of the seat assembly. In such a case, an outer contour 36A of the second cushion portion 36 may be formed to generally coincide with an outer contour 34A of the first cushion portion 34 to achieve a cohesive overall shape for the seat cushion 26 when the second cushion portion is folded onto the first cushion portion. In another embodiment shown in FIG. 3-4, the first cushion portion 34 includes a pocket 42. In such a case, the table 38 may be positioned in the pocket 42. Furthermore, as shown, in the second embodiment the second cushion portion 36 pivots to selectively fit into and extend out of the pocket 42 to thereby selectively cover and uncover the table 38. As shown in FIG. 3, the outer contour 36A of the second cushion portion 36 may be formed to generally coincide with an inner contour 34C of the first cushion portion 34 to achieve a substantially continuous overall shape for the seat cushion 26 when the second cushion portion is folded into the first cushion portion. Accordingly, when in the embodiment of FIGS. 3-4 the second cushion portion 36 is folded into the first cushion portion 34, the first cushion portion 34 and the second cushion portion 36 together define the seat cushion support surface 28 for an occupant of the seat assembly 10.

Figure 4:
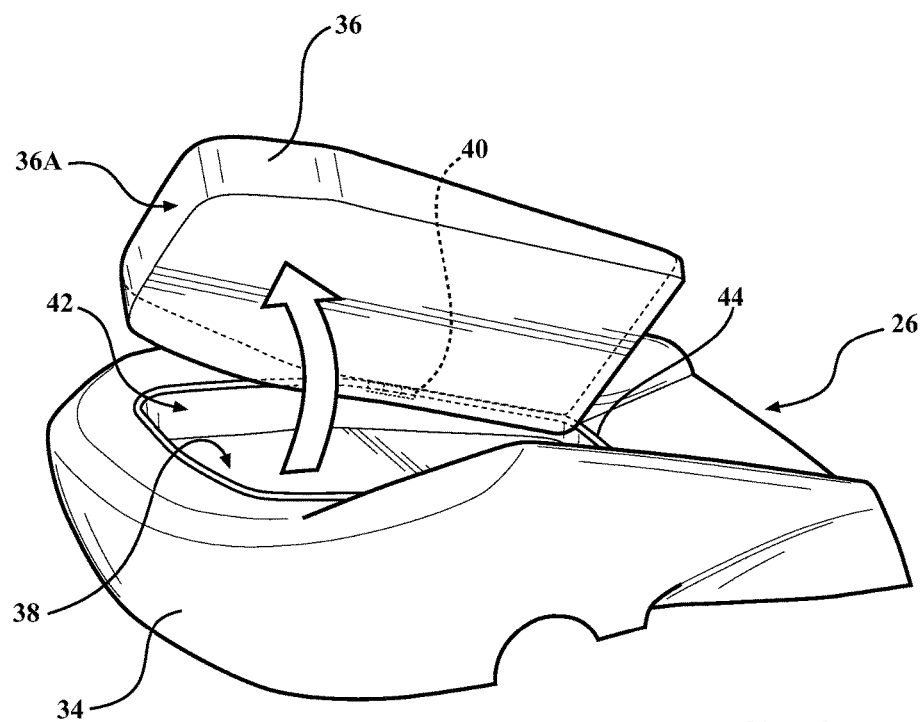
FIG. 4 is a perspective view of the seat assembly having the hideaway table shown in FIG. 3, illustrating a portion of a seat cushion being pivoted to uncover the hideaway table according to the disclosure.

As shown in FIG. 4, in the second embodiment disclosed above, the seat cushion 26 may additionally include a table frame 44 arranged between the table 38 and the first cushion portion 34 and fixed to the first cushion portion. The table frame 44 may be configured to concretely define the pocket 42 and permit the second cushion portion 36 to reliably fit into the first cushion portion 34. Additionally, the table frame 44 may be constructed and positioned to stay below the seat cushion support surface 28, to minimize the possibility of adversely affecting comfort of the seated occupant. The table 38 may be detachably fixed in place, such as with a hook and loop fastener, clips, and/or snaps, or otherwise secured to the table frame 44. Each of the table frame 44, the first section 38A, and the second section 38B may be formed from a polymer material for light weight and reliable retention of general form or contour. As shown in FIGS. 1 and 3, the seat cushion 26 is defined by a length L arranged along a first axis X, which can be parallel to a longitudinal axis of the host vehicle 12, and a width W arranged along a second axis Y, which can be defined by a width of the host vehicle. As shown, the second axis Y is orthogonal to the first axis X. The second cushion portion 36 is configured to pivot relative to the first cushion portion 34 in a direction along the second axis Y.

As shown in FIG. 2, the seat assembly 10 may include a locking device 46 configured to maintain the second cushion portion 36 in contact with the first cushion portion 34 when the second cushion portion is folded onto the first cushion portion. The locking device 46 may be configured as a magnetic fastener, a snap lock, etc. The seat assembly 10 may additionally include a guide feature 48, such as at least one pin, to ensure that the second cushion portion 36 is maintained in alignment with the first cushion portion 34 when the second cushion portion is folded onto the first cushion portion.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A seat assembly comprising:
a seatback;
a seat cushion;
a seat frame having a first seat frame structure configured to support the seatback and a second seat frame structure configured to support the seat cushion; and
a hideaway table positioned in the seat cushion;
wherein:
the first seat frame structure is operatively connected to the second seat frame structure;
the seat cushion defines a seat cushion support surface for an occupant of the seat assembly and includes a first cushion portion fixed to the second seat frame structure and a second cushion portion operatively connected to the first cushion portion;
the second cushion portion is configured to pivot relative to the first cushion portion to selectively cover and uncover the table;
the first cushion portion and the second cushion portion together define the seat cushion support surface for an occupant of the seat assembly;
the first cushion portion includes a pocket;
the table is positioned in the pocket;
the second cushion portion pivots to selectively fit into and extend out of the pocket to thereby selectively cover and uncover the table;
the seat cushion additionally includes a table frame arranged between the table and the first cushion portion, and fixed to the first cushion portion; and
the table is detachably secured to the table frame.

2. The seat assembly of claim 1, wherein:
the seat cushion is defined by a length arranged along a first axis and a width arranged along a second axis orthogonal to the first axis; and
the second cushion portion is configured to pivot relative to the first cushion portion in a direction along the second axis.

3. A vehicle comprising:
a vehicle structure; and
a seat assembly having a seat frame operatively connected to the vehicle structure;

wherein:
the seat frame has a first seat frame structure configured to support a seatback and a second seat frame structure configured to support a seat cushion;
the first seat frame structure is operatively connected to the second seat frame structure;
the seat cushion defines a seat cushion support surface for an occupant of the seat assembly and includes a first cushion portion fixed to the second seat frame structure and a second cushion portion operatively connected to the first cushion portion;
the seat cushion includes a hideaway table;
the second cushion portion is configured to pivot relative to the first cushion portion to selectively cover and uncover the table;
the first cushion portion and the second cushion portion together define the seat cushion support surface for an occupant of the seat assembly;
the first cushion portion includes a pocket;
the table is positioned in the pocket;
the second cushion portion pivots to selectively fit into and extend out of the pocket to thereby selectively cover and uncover the table;
the seat cushion additionally includes a table frame arranged between the table and the first cushion portion, and fixed to the first cushion portion; and
the table is detachably secured to the table frame.

4. The vehicle of claim 3, wherein:
the seat cushion is defined by a length arranged along a first axis and a width arranged along a second axis orthogonal to the first axis; and
the second cushion portion is configured to pivot relative to the first cushion portion in a direction along the second axis.

* * * * *